Patented Dec. 26, 1950

2,535,538

UNITED STATES PATENT OFFICE 2,535,538

GELATINOUS COMPOSITION OF MATTER AND METHOD OF PREPARING SAME

Louis Koch, New York, N. Y., assignor to H. Kohnstamm & Co. Inc., New York, N. Y., a corporation of New York No Drawing. Application March 17, 1949, Serial No. 82,015

7 Claims. (Cl. 99—130)

This invention relates to an improved gelatinous composition of matter as a medium for the transfer of color and flavor into foods, confectionery and the like and to a method of forming same.

Heretofore in the art, as in Denny Patent No. 1,388,174 issued August 23, 1921, it has been proposed to form a gelatinous composition of matter in which the color and/or flavoring compound in aqueous solution is substantially uniformly distributed through the gelatin. The addition of known amounts of this gelatinous composition to foods, confectionery and the like food substances in the process of forming same effectively impregnates the substance with the flavor or color contained in the mixture.

In the manufacture of such gelatinous compositions, however, in accordance with the method of the said patent it has been found that the gelatinous composition on standing or on passing through one or more changes of temperature, undergoes physical changes often becoming hard and crystalline and unsuitable for use as a transfer medium.

The object of this invention is to overcome this major defect in this said transfer medium and to provide a gelatinous composition of this general type which is stable over an extended storage time period and over a wide range of temperature variations.

Another object is to provide a gelatinous composition consisting of an edible color and/or flavor solution dispersed uniformly throughout a gelatinous body which is stable and non-crystallizable over an extended storage time interval and over a wide range of temperature variations.

A further object is to improve the stability and storage properties of the gelatinous composition of the said Denny patent.

Other objects will be apparent as the invention is more fully hereinafter disclosed.

In accordance with these objects I have discovered that the hardening of the gelatinous composition of the said Denny patent on standing and on being subjected to temperature variations is primarily due to the fact that the color compound held in aqueous solution in the gelatin recrystallizes from solution either as a result of water vaporization from the gelatinous composition or as a result of changes in temperature.

To overcome this defect in the gelatinous composition of the said patent I have discovered that the color compound must first be placed substantially completely in solution, the color solution colloidally dispersed throughout the gelatinous solution while both solutions are in the liquid phase and that an edible dispersing agent must be present in the liquid phase dispersion to uniformly disperse the color compound in small particle size as it thereafter tends to recrystallize out of dispersed solution upon solidification of the gelatinous solution on cooling, and upon subsequent re-solution or re-crystallization of the color compound during the time interval elapsing before use incident to drying of the gelatin composition or to variations in storage temperatures.

In accordance with this discovery the gelatinous composition of the said Denny patent is improved and stabilized against recrystallization and hardening on drying and on being subjected to wide temperature variations in the following manner:

The color compound, for example, amaranth, is reduced to small particle size, as by milling, and is mixed with the other ingredients of the mixture, such as gelatin, edible gum, sugar and glycerin, and with water in a mixer at a temperature approximating but somewhat below the boiling point of water (220° F.), preferably at a temperature of about 200° F., using a sufficient amount of water and glycerin in the mixture to substantially completely dissolve the color and the other water soluble constituents present therein. An amount of a dispersing agent, such as lecithin, is added to the hot liquid phase solution to hold the color solution in dispersion throughout the gelatin solution and the hot solution is then passed through a high duty colloid mill, homogenizer or such type of apparatus, to obtain uniform dispersion of the color solution throughout the gelatinous solution. The homogenized or dispersed liquid phase solutions thus obtained are cooled, preferably as rapidly as possible, to solidification or gelatinizing temperature and is thereafter cut, shaped or otherwise subdivided into desired sized cakes or portions.

In the practice of this invention, the dispersion agent, such as lecithin, may be added before or after the colloidal dispersion of the color solution in the gelatin solution without departure from the invention, and in place of lecithin a number of other non-toxic, edible dispersing agents may be employed without departure from the invention, as one skilled in the art may recognize, the use of such dispersing agents in the forming of food products being subject to approval for non-toxicity under the Food and Drug Act. Lecithin is an accepted compound for use in food products and is used by way of example and not by way of limitation. Substantial equivalents for lecithin, for example, are sorbitol mono-stearate, glyceryl mono-stearate and glyceryl mono-oleate.

In substitution for amaranth in the above mixture, I may employ any certified water or glycerin soluble food color, of which there are now about 12 or 13 certified for use in foods by the Food and Drug Commission, amaranth being identified in that list as F. D. and C. red No. 2.

As a typical example of the gelatinous composition formed in accordance with the present invention the following is given:

| | Per cent |
|---|---|
| Water or glycerin soluble edible color (amaranth) | 26.00 |
| Sugar (lactose, maltose or sucrose) | 32.50 |
| Gelatin (2% agar solution) | 10.00 |
| Edible gum (gum tragacanth, gum arabic, etc. in 4% solution) | 2.00 |
| Glycerin (sorbitol, propylene glycol) | 29.00 |
| Dispersing agent (lecithin, etc.) | .50 |

To this mixture an amount of a flavoring compound may be added, if desired.

As the water or glycerin soluble color compounds utilizable in substitution for amaranth in the above example of the present invention vary widely in solubility, in the water-glycerin solvent solution, it is sometimes undesirable to employ sufficient water in the solution to substantially completely dissolve the color, in which case it is generally sufficient to dissolve the major portion of the color where the particle size of the undissolved color is extremely small and of substantially colloidal size such as may subsequently be colloidally dispersed and held in dispersion in the liquid phase dispersion by the dispersing agent, lecithin.

In the present invention the mechanically dispersed color solution in the gelatin solution is held in dispersion by the dispersing agent until the gelatinous solution solidifies on cooling. In such dispersed solution, any recrystallization of the color compound from solution that occurs on cooling to the solidification temperature of the gelatin solution is itself dispersed in small sized crystals. Subsequent temperature changes or loss of water content by drying is ineffective to promote grain growth of the dispersed crystals of the color compound due to the blocking effect of the gelatin matrix and the continued dispersing effect of the dispersing agent in solution therein.

The gelatinous composition of the present invention has greatly improved storage properties over that of the said Denny patent remaining stable and substantially unchanged under widely varying storage and temperature conditions for time intervals greatly exceeding that of the gelatinous composition of the said prior Denny patent. In addition, by the use of the dispersing agent to stabilize the mechanically colloidally dispersed color solution in the gelatin solution, the amount of the color present in the gelatinous mixture may be substantially increased in the gelatinous mixture without attendant difficulties of hardening on standing as heretofore experienced.

Other advantages will appear to those skilled in the art and all such and all modifications of and departures from the invention are contemplated as may fall within the scope of the following claims:

What I claim is:

1. The method of forming a colored gelatinous composition of matter which comprises forming an aqueous-glycerin solution of a color compound, colloidally dispersing the color solution mechanically into a liquid phase aqueous gelatinous solution, incorporating in the liquid phase colloidal dispersion thus obtained a proportion of an edible dispersing agent for said colloidally dispersed color solution, and cooling the dispersion to the solidification temperature of the gelatinous solution.

2. The method of forming a colored gelatinous composition of matter which comprises dissolving a water soluble color compound in a hot aqueous glycerin solution containing an edible colloid dispersing agent, colloidally dispersing the color solution mechanically throughout a hot gelatinous solution, and cooling the colloidally dispersed solution to its solidification temperature.

3. The method of forming an edible and colored, gelatinous composition of matter which comprises colloidally dispersing a hot aqueous-glycerin solution of a food color mechanically throughout a hot gelatinous solution containing a proportion of an edible colloid dispersing agent therein and cooling the colloidally dispersed solutions to solidification temperature.

4. The method of claim 3, wherein a hot aqueous solution containing said food color, sugar, edible gum, gelatin, glycerin, lecithin and water in such relative proportions providing for the substantially complete solution of the said color, sugar, gum and gelatin, is formed and mechanically homogenized to uniformly disperse the compounds therein while hot, and then cooled relatively rapidly to solidification temperature.

5. A composition of matter consisting of an aqueous-glycerin solution of a water soluble edible color dispersed in gelatin and stabilized against recrystallization deterioration by an edible dispersing agent in solution therewith.

6. The composition of claim 5, said edible dispersing agent consisting of lecithin.

7. A gelatin composition of matter consisting of a water-glycerin solution of a water soluble edible food color dispersed in a solidified gelatin-edible gum solution and held in dispersion therein by an edible dispersing agent.

LOUIS KOCH.

REFERENCES CITED

The following references are of record in the file of this patent:

UNITED STATES PATENTS

| Number | Name | Date |
|---|---|---|
| 1,388,174 | Denny | Aug. 23, 1921 |
| 1,953,438 | Schlack | Apr. 3, 1934 |